(12) United States Patent
Bonnevie et al.

(10) Patent No.: US 10,997,261 B2
(45) Date of Patent: May 4, 2021

(54) SYSTEM AND METHOD THAT FACILITATE DISPLAY RESPONSIVE MESSAGE RENDERING ON CLIENT DEVICE

(71) Applicant: Google LLC, Mountain View, CA (US)

(72) Inventors: Mikael Bonnevie, Mountain View, CA (US); An-Tai Li, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 36 days.

(21) Appl. No.: 16/123,388

(22) Filed: Sep. 6, 2018

(65) Prior Publication Data
US 2020/0082022 A1 Mar. 12, 2020

(51) Int. Cl.
| | | |
|---|---|---|
| G06F 17/00 | (2019.01) | |
| G06F 16/955 | (2019.01) | |
| G06Q 30/02 | (2012.01) | |
| G06F 16/957 | (2019.01) | |
| G06F 40/169 | (2020.01) | |

(52) U.S. Cl.
CPC ...... *G06F 16/9558* (2019.01); *G06F 16/9577* (2019.01); *G06F 40/169* (2020.01); *G06Q 30/0241* (2013.01)

(58) Field of Classification Search
CPC . G06F 16/9558; G06F 17/241; G06F 30/0241
See application file for complete search history.

(56) References Cited

U.S. PATENT DOCUMENTS

| | | | | |
|---|---|---|---|---|
| 8,577,181 | B1* | 11/2013 | Badros | G06Q 30/0277 345/660 |
| 8,645,851 | B1* | 2/2014 | Milne | G06F 9/451 715/762 |
| 8,738,448 | B2* | 5/2014 | Zhang | G06Q 30/0277 705/14.73 |
| 8,774,536 | B1* | 7/2014 | Jia | G06K 9/00979 382/232 |
| 9,158,800 | B2* | 10/2015 | Lucash | G06F 16/22 |
| 9,164,966 | B1* | 10/2015 | Llach | G06F 17/211 |
| 9,247,029 | B1* | 1/2016 | Jia | G06K 9/00979 |
| 9,268,469 | B2* | 2/2016 | Li | G06F 3/04842 |
| 9,417,765 | B1* | 8/2016 | Lewis | G06F 3/0482 |
| 9,874,989 | B1* | 1/2018 | Lewis | G06F 3/048 |

(Continued)

*Primary Examiner* — Maikhanh Nguyen
(74) *Attorney, Agent, or Firm* — Leason Ellis LLP

(57) ABSTRACT

A multimedia communication system for transmitting a display responsive multimedia content message to an end user computing device to be rendered on a display device. The multimedia communication system comprises a content packager that assembles a multimedia content package comprising the multimedia content message, and a content renderer that generates a display responsive multimedia content rendering application associated with the multimedia content message, wherein the multimedia content message includes a source artifact having an image, a content artifact having text, and a contextual selector having a hyperlink, and wherein the display responsive multimedia content rendering application includes one or more annotations or instructions to render the multimedia content message to display the source artifact to occupy a substantial portion of a display area for the multimedia content message.

20 Claims, 11 Drawing Sheets

(56) References Cited

U.S. PATENT DOCUMENTS

| | | | | |
|---|---|---|---|---|
| 2008/0201437 A1* | 8/2008 | Ludwig | ............... | H04L 51/04 |
| | | | | 709/206 |
| 2009/0085921 A1* | 4/2009 | Do | ............... | G09G 5/14 |
| | | | | 345/543 |
| 2010/0188705 A1* | 7/2010 | Giannetti | ............... | G06F 17/211 |
| | | | | 358/1.18 |
| 2011/0007096 A1* | 1/2011 | Miyano | ............... | G06F 3/0485 |
| | | | | 345/660 |
| 2011/0231260 A1* | 9/2011 | Price | ............... | G06Q 30/02 |
| | | | | 705/14.61 |
| 2014/0095514 A1* | 4/2014 | Filev | ............... | G06F 17/212 |
| | | | | 707/748 |
| 2014/0281901 A1* | 9/2014 | Mostowy | ............... | G06F 16/9577 |
| | | | | 715/234 |
| 2014/0365604 A1* | 12/2014 | Lewis | ............... | H04L 67/20 |
| | | | | 709/217 |
| 2015/0142560 A1* | 5/2015 | Singh | ............... | G06Q 30/0267 |
| | | | | 705/14.53 |
| 2015/0186494 A1* | 7/2015 | Gilad | ............... | H04L 51/22 |
| | | | | 707/740 |
| 2016/0080296 A1* | 3/2016 | Lewis | ............... | H04L 51/08 |
| | | | | 715/752 |
| 2016/0330499 A1* | 11/2016 | Lewis | ............... | G06F 3/0482 |
| 2017/0301120 A1* | 10/2017 | Margolin | ............... | G06T 11/60 |

* cited by examiner

SYSTEM AND METHOD THAT FACILITATE DISPLAY RESPONSIVE MESSAGE RENDERING ON CLIENT DEVICE

FIELD OF THE DISCLOSURE

The present disclosure relates to a communication system and method, and, more particularly, to a communication system and method that can interactively link and display device responsive device-agnostic multimedia content on an end-user computing device.

BACKGROUND OF THE DISCLOSURE

In a computer networked environment such as the Internet, content providers supply content items for display on end-user computing devices. These content items can include logos, images, text, video and/or audio content, and the like. The content items can be linked to web pages associated with the content providers. Frequently, these content items include display messages that are displayable as text only on end-user computing devices, and that have display formats that are incommodious and inefficient when displayed.

FIG. 1A depicts an example of a content item that can be displayed on a desktop computer via the Internet. The content item includes an example of content that is displayed with a heading 2, text 3, a website identifier 4, and a call-to-action arrow 6. The call-to-action arrow 6 can be linked to a web page or a website belonging to the content provider.

FIG. 1B depicts an example of the same content item in FIG. 1A, but this time it is shown as it may appear on a smartphone device.

As seen in FIGS. 1A and 1B, the layout of the displayed content item emphasizes the title and call-to-action, as these are likely to be "clicked" by users. The content item, however, can be difficult to read because of its layout, and the user might not have any idea where s/he will be redirected upon selecting the call-to-action arrow.

An unfulfilled need exists for a communication system and method that can provide display responsive device-agnostic multimedia content to end-user computing devices that is easy to read and that can provide users with an indication of what action is likely to follow with the click of a call-to-action selector, such that each computing device can display the multimedia content in a user-accommodating and efficient format, while displaying the multimedia content so that it meets display requirements of the particular end-user computing device.

SUMMARY OF THE DISCLOSURE

The instant disclosure provides a communication system and a communication method that meet the unfulfilled need. The communication system and method provide display responsive device-agnostic multimedia content to end-user computing devices, such that each computing device can display the multimedia content in an optimal display format based on the specific contents in the multimedia content item and the particular requirements of the display device.

According to an aspect of the disclosure, a multimedia communication system is disclosed for transmitting a display responsive multimedia content message to an end user computing device to be rendered on a display device. The multimedia communication system comprises: a content packager that assembles a multimedia content package comprising the multimedia content message; and a content renderer that generates a display responsive multimedia content rendering application associated with the multimedia content message, wherein the multimedia content message includes a source artifact having an image, a content artifact having text, and a contextual selector having a hyperlink, and wherein the display responsive multimedia content rendering application includes one or more annotations or instructions to render the multimedia content message to display the source artifact to occupy a substantial portion of a display area for the multimedia content message.

The display responsive multimedia content rendering application can include one or more annotations or instructions to render the multimedia content message to display the source artifact, content artifact and contextual selector in an F-pattern layout.

The display responsive multimedia content rendering application includes one or more annotations or instructions to render the source artifact to occupy between about 12% and about 65% of a width of the display area for the multimedia content message.

The display responsive multimedia content rendering application can include one or more annotations or instructions to render the source artifact to occupy about 36% of a width of the display area for the multimedia content message.

The display responsive multimedia content rendering application can include one or more annotations or instructions to render the contextual selector to occupy between about 50% and about 60% of a width of the display area for the multimedia content message.

The multimedia content message can include a call-to-action backdrop, and wherein the display responsive multimedia content rendering application includes one or more annotations or instructions to render the contextual selector with the call-to-action backdrop to occupy between about 15% and about 25% of a height of the display area for the multimedia content message.

The multimedia content message can include a call-to-action backdrop, and wherein the display responsive multimedia content rendering application includes one or more annotations or instructions to render the contextual selector with the call-to-action backdrop to occupy about 17% of a height of the display area for the multimedia content message.

The display responsive multimedia content rendering application can include one or more annotations or instructions to render the source artifact to occupy a pixel array size based on an image resolution of the display device and one or more content slot defining instructions that define the display area for the multimedia content message.

The one or more content defining instructions can comprise a height value and a width value. The one or more content defining instructions can comprise a display screen location value.

According to another aspect of the disclosure, a computer-readable medium is disclosed that contains computer executable instructions that, when executed by a hardware processor of a first device, cause the processor to perform a method to transmit a display responsive multimedia content message to a second device to be rendered on a display device. The method comprises: retrieving a multimedia content package from a content packager or a database at the first device; retrieving a display responsive multimedia content rendering application at the first device, the display responsive multimedia content application being associated with the multimedia content package; assembling the multimedia content package and the display responsive multimedia content rendering application into a plurality of transmission packets; and transmitting the plurality of transmission packets to the second device, wherein the multimedia content package comprises a multimedia content message, wherein the multimedia content message includes a source artifact having an image, a content artifact having text, and a contextual selector having a hyperlink, and wherein the display responsive multimedia content rendering application includes one or more annotations or instructions to render the multimedia content message to display the source artifact to occupy a substantial portion of a display area for the multimedia content message.

Additional features, advantages, and embodiments of the disclosure may be set forth or apparent from consideration of the detailed description, drawings and attachment. Moreover, it is to be understood that the foregoing summary of the disclosure and the following detailed description, drawings and attachment are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1A:
FIG. 1A depicts an example of a content item that can be displayed on a desktop computer via the Internet.
Figure 1B:
FIG. 1B depicts an example of the same content item in FIG. 1A, but this time it is shown as it may appear on a smartphone device.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 2:
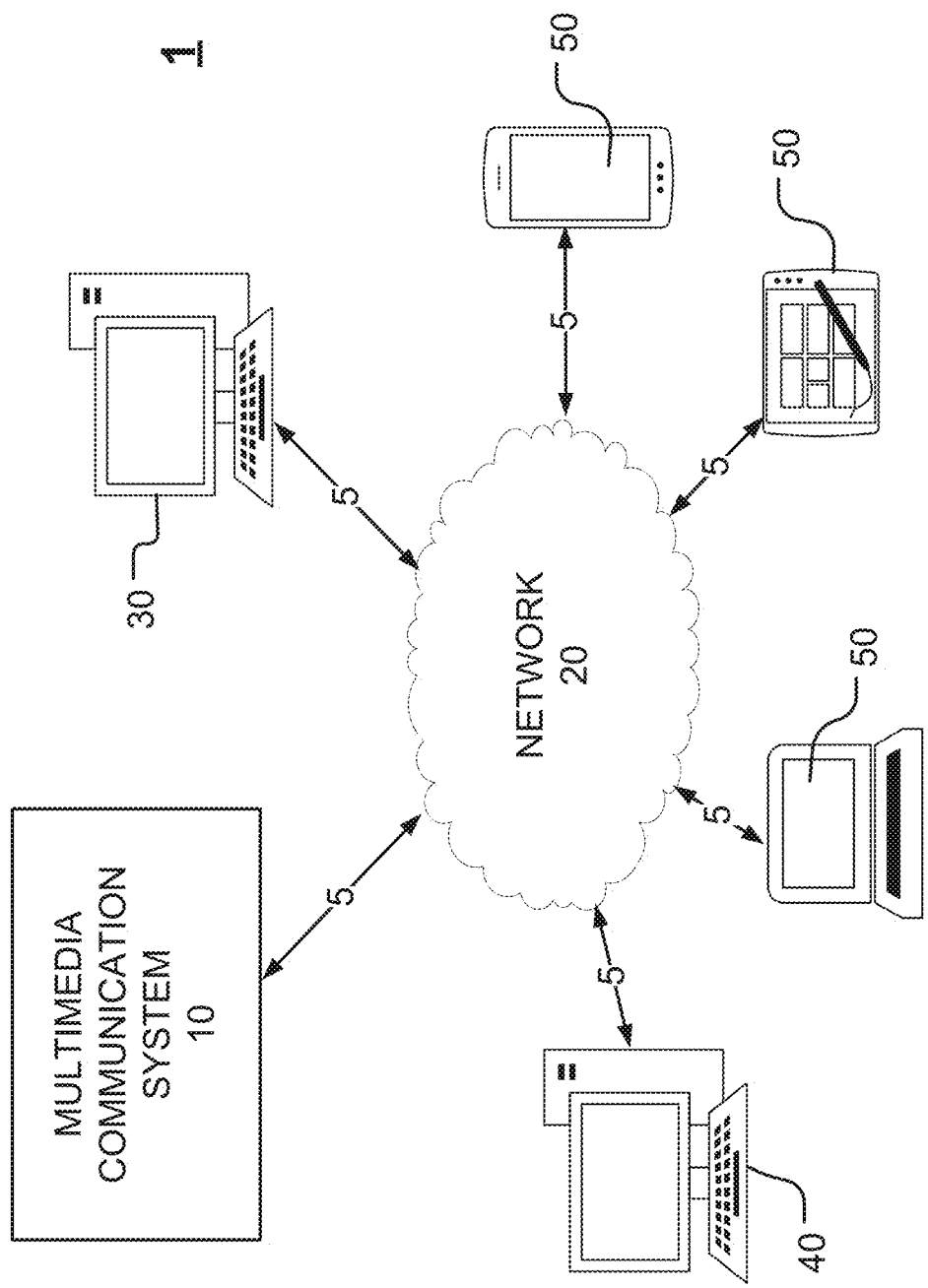
FIG. 2 depicts an example of an environment that includes a multimedia communication system that is constructed according to the principles of the disclosure.

FIG. 2 is a block diagram depicting an implementation of a multimedia communication system 10 in a communication environment 1. The communication environment 1 can include a network 20, a content providing computing (CPC) device 30, a content publishing computing (CPS) device 40, and one or more end-user computing (EUC) devices 50, any or all of which can be coupled to each other directly and/or via the network 20 through one or more communication links 5.

The multimedia communication system 10 can include at least one server. For instance, the multimedia communication system 10 can include a plurality of servers located in at least one data center or server farm. FIG. 2 is a block diagram depicting an example of the multimedia communication system 10, which is discussed in greater detail below.

The multimedia communication system 10 can be configured to provide a display responsive multimedia content (DRMC) message to end user computing devices 50. The DRMC message can be displayed with or without display content provided by a publishing content provider, such as, for example, a publisher's web page or website, or a results page or a landing page of a search operator. For instance, the DRMC message can be generated within an application (not shown) being executed by an end user computing device 50. The DRMC message can be designed to, for example, identify a particular content source provider associated with the DRMC message, such as by using the content provider's image (e.g., logo), color, or other source identifier. The image can be displayed so that it is large in size relative to the rest of the DRMC message.

The DRMC message can include a contextual selector that can be implemented as a call-to-action button that improves a user's experience. The contextual selector can be rendered separate from the other contents in the DRMC message. The contextual selector can be configured as a capsule, an oval, a rectangle, or any other shape that serves the purposes contemplated herein without departing from the scope or spirit of the disclosure. The DRMC message can include text that could suggest the action that will be carried out upon selection of the contextual selector.

The DRMC message can be displayed with a backdrop that can provide, for example, a card-like background for the display of the content in the DRMC message. The backdrop can function to fill any white space that might otherwise appear in a content slot provided in a display screen, where the content slot might define a display area for the DRMC message. The backdrop can have a grey color and can control the size and/or shape of the DRMC message.

The CPC device 30 includes a computer that can be operated (e.g., by the content provider) to provide multimedia content that includes a source artifact and/or a content artifact for display as a DRMC message on information resources on one or more EUC devices 50, such as, for example, a website or a web page that includes primary content provided by the CPS device 40, or for display on a search results page or a landing page provided by a search engine. The multimedia content can include, for example, a content provider source identifier, text, a photo or an image, a logo, a video, a uniform resource locator (URL) address, a sound, and/or the like The CPC device 30 can provide or be the source of multimedia content for display of DRMC messages in one or more content slots of, or overlaid on primary content displayed on information resources on the EUC device 50, such as, for example, a web page of a publishing content provider where the primary content of the web page is provided by the publishing content provider (e.g., via CPS device 40), or on a search results page or a landing page provided by a search engine. The content slot(s) can be defined by the CPS device 40, including a width, a height, a shape, and/or a location for the content slot(s) on the primary content. For instance, one or more content slot defining instructions may be received by the multimedia communication system 10 from the CPS device 40, where the content defining instructions might identify where the DRMC message can appear on the display screen with the primary content, the shape that the DRMC message can assume (e.g., a rectangle), and the display area that the DRMC message can assume (e.g., width and height, or a width:height ratio). The DRMC message associated with the CPC computer 30 can be displayed on information resources other than web pages, such as, for example, content displayed as part of the execution of an application on the EUC device 50.

The CPS device 40 includes a computer that can be operated by a content publisher to provide primary content for display on one or more EUC devices 50 via the network 20. The primary content can include, for example, a web page, a website, a movie, a video, a televisions program or show, a photo, social media content, or the like. The CPS device 40 can include a web page operator who provides primary content for display on the web page or website, which can be hosted on the CPS device 40 or elsewhere in the communication environment 1. The primary content can include content other than, or in addition to content provided by the CPS device 40.

The CPS device 40 can operate the website of a publishing content provider and can provide primary content for display on one or more web pages of a website. The web page can include a content slot that is configured for combining and displaying one or more DRMC messages associated with the multimedia content provided by the CPC device 30. The CPS 40 can provide data and instructions to define the content slot(s) to appear with or in the primary content, including the width (or range of widths), a height (or range of heights), a shape (or range of shapes), and/or a location (or range of locations) for the content slot(s) and how it can be displayed on a display screen with or on the primary content.

The CPS device 40 can include a search engine computing device (e.g. server) of a search engine operator that operates a search engine web site. The primary content of a search engine web page, such as, e.g., a search results web page or a landing web page, can include the results of a search or the landing web page displayed with the DRMC message, such as, for example, in a content slot on the search results web page or landing web page.

The EUC device 50 can include a computer that is configured to communicate via the network 20 and a display device that can be configured to display data such as the primary content provided by the CPS device 40 (e.g., primary web page content or other information resources) and the MC items associated with the multimedia content provided by the CPC device 30. The EUC device 50 can include a communication device through which an end user can submit requests to receive content. The requests can be requests to a search engine and the requests can include search queries. In some implementations, the requests can include a request to access a web page or website.

The EUC device 50 can display the primary content provided by the CPS device 40 and one or more DRMC messages associated with the multimedia content provided by the CPC device 30. The EUC device 50 can display the primary content and the DRMC message on a display screen, filling one or more content slots in or on the primary content with the DRMC message(s), including, for example, the DRMC message associated with multimedia content provided by the CPC device 30. The content slots can be dynamic and can be automatically adjusted in terms of position, layout, shape, and/or size on the display device of the EUC device 50. The location, layout, shape, and/or size of the content slots can be adjusted based on data and/or instructions provided in a DRMC message rendering application. The DRMC message rendering application can be stored locally at the EUC device 50, in the multimedia communication system 10, and/or elsewhere in the environment 1.

The DRMC message rendering application can include markup language annotations for identifying content and creating structured documents, including images, text, links, sounds, and other objects. The markup language annotations can include a plurality of tags for displaying DRMC messages such as those shown in FIGS. 5-8 on the EUC devices 50. The markup language can include, for example, Standard Generalized Markup Language (SGML), Scalable Vector Graphics (SVG), Hypertext Markup Language (HTML), Extensible Markup Language (XHTML or XML), XML User Interface Language (XUL), LaTeX, and the like. The markup language annotations can be provided as a DRMC markup language file (e.g., "DRMCmessage001.html") that can be executed by, for example, a web browser running on the EUC device 50 to render the DRMC message on its display device.

The DRMC message rendering application can include style sheet language annotations for providing rules for stylistics and for describing the presentation of the content and document with the markup language annotations, such as, for example, the DRMC markup language file "DRMCmessage001.html". The style sheet language annotations can include, for example, colors, fonts, layouts, and other stylistic properties. The style sheet language can include, for example, Cascading Style Sheet (CSS), Document Style Semantics and Specification Language (DSSSL), Extensible Stylesheet Language (XSL), and the like. The style sheet language annotations can be provided as a DRMC style sheet language file (e.g., "DRMCmessage001.css"). Alternatively, the style sheet language annotations can be incorporated into the file containing the markup language annotations (e.g., "DRMCmessage001.html").

The DRMC message rendering application can include scripting language instructions to create interactive effects related to the markup language annotations (e.g., DRMC markup language file "DRMCmessage001.html") and/or style sheet language annotations (e.g., DRMC style sheet language file "DRMCmessage001.css"). The scripting language can include, for example, Bash (e.g., for Unix operating systems), ECMAScript (or JavaScript) (e.g., for web browsers), Visual Basic (e.g., for Microsoft applications), Lua, Python, and the like. The scripting language instructions can include instructions that when executed by, for example, the web browser on the EUC device 50 effect rendering of interactive DRMC messages such as those shown in FIGS. 5-8 on the display device of the EUC device 50. The scripting language instructions can be provided as a DRMC scripting language file (e.g., "DRMCmessage001.js"). Alternatively, the scripting language instructions can be incorporated into the file containing the markup language annotations (e.g., "DRMCmessage001.html").

The DRMC message rendering application can include a document object model (DOM) such as for HTML or XML (e.g., DOM5 HTML) that can create object-oriented representations of the content or documents that can be modified with the scripting language instructions. A DOM includes a cross-platform and language-independent convention for representing and interacting with objects in HTML, XHTML/WL, SGML, SVG, XUL, or the like. As used herein, a document can refer to the DOM's underlying document.

The DRMC message rendering application can be configured to be executable on the EUC devices 50 and can follow a model-view-controller (MVC) design pattern for user interfaces. According to the MVC design pattern, an application can be divided into three areas of responsibility, including: (1) the Model, which includes the domain objects or data structures that represent the application's state; (2) the View, which observes the state and generates an output to the users; and, (3) the Controller, which translates user input into operations on the model.

The CPC device 30, CPS device 40, and EUC device 50 can each include a processor (not shown) and a memory (not shown). The memory can include a computer-readable medium that stores various software programs and/or instructions or sets of instructions that, when executed by the processor, cause the processor to process data and perform one or more of the operations described herein.

The CPC device 30, CPS device 40, and EUC device 50 can include one or more user interface devices (not shown). In general, a user interface device can be any electronic device that conveys data to a user by generating sensory information (e.g., a visualization on a display, one or more sounds, a haptic production (e.g., Braille produced on a haptic display, a vibration, etc.), and/or converting received sensory information from a user into electronic signals (e.g., a keyboard, a mouse, a pointing device, a touch screen display, a microphone, etc.). The one or more user interface devices can be internal to a housing of the CPC device 30, CPS device 40, and/or EUC device 50 (e.g., a built-in display, keyboard, microphone, touchpad, etc.) or external to the housing of the CPC device 30, CPS device 40, and/or EUC device 50 (e.g., a display device connected to the EUC device 50, a speaker connected to EUC device 50, etc.). The multimedia communication system 10 can include one or more user interface devices.

The CPC device 30, CPS device 40, and/or EUC device 50 can include an electronic display device that visually displays web pages using web page data and instructions received from one or more content sources and/or from the multimedia communication system 10 via the network 20. For instance, a multimedia content provider can communicate via the CPC device 30 with multimedia communication system 10 or with the CPS device 40 or EUC device 50 via the multimedia communication system 10.

Figure 3:
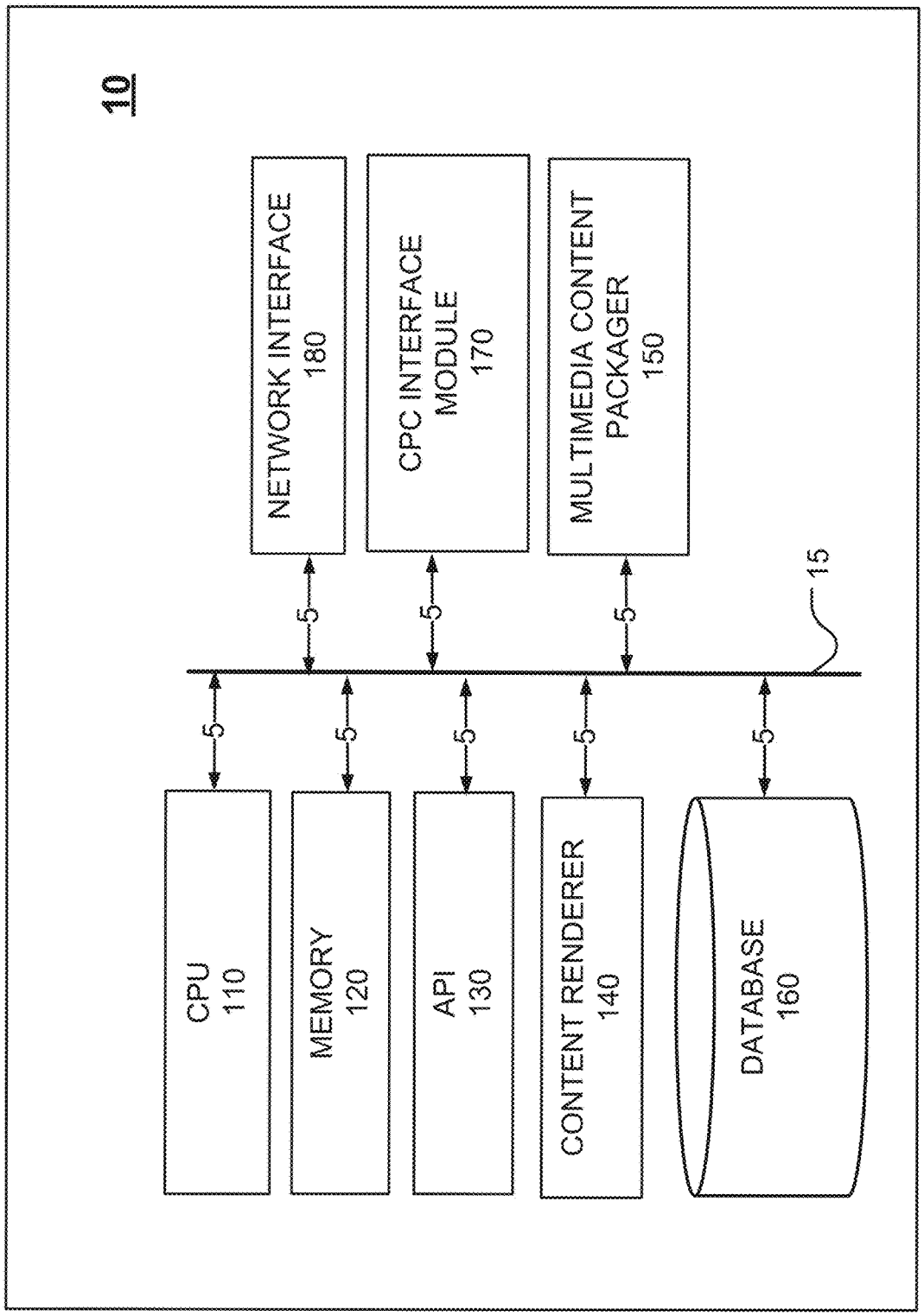
FIG. 3 depicts a block diagram of an example of a multimedia communication system that can be included in the environment in FIG. 2.

FIG. 3 is a block diagram depicting an example of a multimedia communication system 10 that is constructed according to the principles of the instant disclosure. The multimedia communication system 10 can include a central processing unit (CPU) 110, a memory 120, an application program interface (API) 130, a content renderer 140, a multimedia content packager 150, a database 160, a CPC interface module 170, and a network interface 180. The multimedia communication system 10 can include a system bus 15. The system bus 15 can communicatively couple the components to each other via communication links 5. The system bus 15 can be any of several types of bus structures that can further interconnect to a memory bus (with or without a memory controller), a peripheral bus, and a local bus using any of a variety of commercially available bus architectures.

Although depicted as separate components, one or more of the components 110 to 180 can be integrated and provided as a single component or fewer than the number of components depicted in FIG. 3.

Any one or more of the components 110 to 180 in the multimedia communication system 10 can include a computer. Each of the components 110 to 180 can be configured to communicate with the other components in the multimedia communication system 10, and with one or more computers that are external to the multimedia communication system 10 (e.g., the CPC device 30, CPS device 40, and/or EUC device 50) via the network 20.

The CPU 110 includes one or more processors that run or execute various software programs and/or instructions or sets of instructions stored in the memory 120 to perform various functions for the multimedia communication system 10 and to process data. The memory 120 includes a computer-readable medium that holds the data and various software programs and/or instructions or sets of instructions in a form and format that is readily accessible to, and readable by the CPU 110.

The API 130 can include one or more platform-neutral or platform-agnostic application programming interfaces (APIs). The API 130 can include one or more DRMC message rendering applications. The DRMC message rendering applications can include data and/or instructions that might be specific to equipment used in EUC devices 50, data and instructions provided by the publishing content provider (e.g., via CPS device 40), or any other data and/or instructions that ensure proper display of the DRMC message with the primary content on EUC devices 50.

The API 130 can include an API for a markup language such as, for example, SGML, SVG, HTML, XHTML/XML), XUL, LaTeX, and the like. The API 130 can include an API for a style sheet language, such as, for example, CSS, DSSSL, XSL, and the like. The API 130 can include a web-based API, an operating system API, a database system API, a computer hardware API, a library API, and the like. The API 130 can include, for example, one or more of the APIs available at <<https://developers.google.com>>. The API 130 can include one or more APIs that connect web pages to scripts or programming languages, including modelling (e.g., SGML, SVG, HTML, XHTML/XML, XUL, and the like) documents as objects.

The API 130 can include a document object model (DOM) API, such as for HTML or XML (e.g., DOM5 HTML), that can create object-oriented representations of web pages that can be modified with a scripting module in the content renderer 140. A DOM includes a cross-platform and language-independent convention for representing and interacting with objects in HTML, XHTML/XML, SGML, SVG, XUL, or the like.

The content render 140 can be configured to create the DRMC message rendering application for a given DRMC message. The content renderer 140 can include a scripting module that can provide a special run-time environment that can automate the execution of tasks in the multimedia communication system 10. The scripting module can include one or more scripting languages, which can range from domain-specific languages to general-purpose languages, such as, for example, Bash (e.g., for Unix operating systems), ECMAScript (or JavaScript) (e.g., for web browsers), Visual Basic (e.g., for Microsoft applications), Lua, Python, and the like. The content renderer 140 can include one or more of the scripting modules found at, for example, <<https://developers.google.com/apps-script/>>.

The content renderer 140 can be configured to cause a web page to be provided to the EUC device 50 that includes web page data and instructions provided by the CPS device 140, and instructions (e.g., web page code) that invoke a rendering script responsive to a request for the web page. The rendering script can be downloaded from the content render 140 to the EUC device 50 and stored locally at the EUC device 50, or it can be provided in real-time with the web page. The rendering script can be provided as part of the DRMC message rendering application.

The rendering script can be configured to cause the EUC device 50 to determine, for example, after a web page is loaded by the EUC device 50, whether a DRMC message rendering application is available that can be configured to render a DRMC message for display with the primary content on the EUC device 50. The web page and the DRMC message can be received from the multimedia communication system 10 by the EUC device 50. The DRMC message rendering application can be configured to function with the equipment in the EUC device 50, including, for example, the operating system (OS), web browser, display device, installed applications and APIs, and the like. The DRMC message rendering application can be configured to cause the EUC device 50 to properly render the primary content and the DRMC message on the device's display screen. The DRMC message rendering application can cause the EUC device 50 to render the DRMC message based on the primary content received from the multimedia communication system 10.

If it is determined that an appropriate DRMC message rendering application is not available (e.g., stored locally) at the EUC device 50, the appropriate DRMC message rendering application can be retrieved from the multimedia communication system 10 and downloaded via network 20 to the EUC device 50. The DRMC message rendering applications can be located in the API 130, content renderer 140 or the multimedia content packager 150. The EUC device 50 can store the DRMC message rendering application in a location that can be accessed by a web browser through which the web page is requested. The EUC device 50 can determine (e.g., via rendering script) whether the appropriate DRMC message rendering application is stored in a location that is identified by one or more settings of the browser.

Where a determination is made that the appropriate DRMC message rendering application is available on the EUC device 50, the rendering script can determine whether the DRMC message rendering application is a current version or an older version that needs to be updated. If it is determined that the DRMC message rendering application is not current, the rendering script can cause the EUC device 50 to download the current version of the DRMC message rendering application from the multimedia communication system 10.

According to an implementation of the instant disclosure, upon receiving the primary content from the multimedia communication system 10, the rendering script can cause the EUC device 50 to receive one or more DRMC messages from the multimedia communication system 10. The DRMC messages can be received from the MC packager 150 or the database 160. The EUC device 50 can parse the source artifacts and/or content artifacts from the DRMC message and cause the EUC device 50 to display the source artifacts and/or content artifacts with the primary content. In this regard, the DRMC message rendering application can cause the EUC device 50 to scale, shape, color, texture, position, arrange layout, add a backdrop, add a background to the contextual selector, and/or add special effects to the source and/or content artifacts in the DRMC message rendered on the display screen of the EUC device 50.

As noted above, the DRMC message can include one or more source artifacts and/or content artifacts for display on information resources, such as, for example, a website or web page that includes primary content provided by the CPS device 40, or for display on a search results page or a landing page provided by a search engine.

The DRMC message rendering application can include computer executable code or instructions or sets of instructions that, when executed by, for example, an EUC device 50, cause the EUC device 50 to render one or more source artifacts and content artifacts with a size, shape, color, texture, position, layout, backdrop, background, and/or special effect, such as, for example, shown in FIGS. 5-8. The DRMC message rendering application can include one or more rules for the display of the DRMC message on the EUC device 50, including, for example, one or more rules that define how the source artifacts and/or content artifacts are to be rendered by the EUC device 50.

For instance, the rules in the DRMC message rendering application can define, when displaying the source artifact, one or more colors (e.g., color(s) in the multimedia content provider's image (e.g., logo) or other source identifier), one or more textures (e.g., texture(s) in the multimedia content provider's image or other source identifier), one or more sizes (e.g., size of the multimedia content provider's image or other source identifier), one or more special effects, and the like. The rules can further define, when rendering the content artifacts, one or more colors, one or more fonts, one or more textures, one or more sizes, one or more layouts, one or more special effects, and the like.

The DRMC message rendering application can include rules that define a contextual selector (e.g., a call-to-action radio button in the shape of a capsule, which can be linked to, e.g., a URL address). The DRMC message rendering application can include rules that define the attributes of the contextual selector, such as, for example, color (e.g., matched to color(s) in the multimedia content provider's image or other source identifier), texture (e.g., matched to texture(s) in the multimedia content provider's image or other source identifier), size (e.g., matched to or displayed as percentage of size of the multimedia content provider's image or other source identifier), position, layout, and the like. The DRMC message rendering application can include rules that define whether a background should be rendered with the contextual selector and, if so, the color, size, shape, position, and any special effects to be rendered for the background.

The DRMC message rendering application can further include rules that define a backdrop (e.g., a card design) to be displayed as a background for the source artifact and/or content artifacts, as well as a color (e.g., grey), texture (e.g., flat), shape (e.g., a rectangle), and size (e.g., a percentage of the display screen) of the backdrop.

The DRMC message rendering application can include one or more rules that define the layout for rendering the DRMC message, with or without the primary content, on the EUC device 50. For instance, the one or more rules can cause the EUC device 50 to render the source artifact and/or the content artifact (including the contextual selector) in an "F" pattern layout (shown in FIG. 8) to improve readability and quick scanning of the source artifact and/or content artifact.

In the case of HTML5, the DRMC message rendering application can include an audio tag (e.g., an instruction to embed an audio file/link in the displayed screen and how to play it), a video tag (e.g., an instruction to embed video in the displayed screen and how to play it), a source tag (e.g., can be used with audio or video to identify a source for the audio or video), an embed tag (e.g., an instruction to embed specified media type for content that might lack support within other media elements), a canvas tag (e.g., an instruction to set aside part of the display screen), a svg tag (e.g., an instruction to embed vector graphics (e.g., source artifacts, textual content, and/or backdrop) encoded with SVG markup language, to allow graphics (e.g., source artifacts, content artifacts, and/or backdrop) to be scaled dynamically to the area and shape of the display screen without losing any graphic quality), and the like. As understood by those skilled in the art, the DRMC message rendering application can include other tags that, when referenced by, for example, a style sheet language, cause the EUC device 50 to render the DRMC message, with or without the primary content, to have a location, layout, size, shape, color, texture, font, special effect, backdrop, and the like, that is optimal for the particular EUC device 50.

For instance, using the canvas tag in HTML5, a portion of a display screen on an EUC device 50 can be targeted for a content slot (or new canvas window) for insertion of the DRMC message, including the height and width of the canvas which might be measured from an upper-left corner of the display screen. The canvas window should match the size of the backdrop, or the size of the source artifact and content artifact where a backdrop is not included. A function can be called to display the MC item in the new canvas window on the EUC device 50 display screen.

According to a non-limiting implementation, the DRMC rendering application can include content slot defining data and instructions, which may have been received by the content renderer 140 from the CPS 40, with or without the primary content, and included in the DRMC rendering application to define the location, shape, size, etc. of the content slot (or canvas window) in or on the primary content when displayed on the EUC device 50. The DRMC message can be rendered on the EUC device 50 based on the content slot defining data and instructions.

According to an implementation of the disclosure that uses an MVC design pattern, an HTML5 document can include a list of Models, and each Model can be a child of the document's body. A DOM subtree can be created on the body of the document, which will represent the View. In this subtree, one or more insertion points can be used as openings in the View, through which the Model bits can show through, and matching criteria of the insertions points can be used by the Controller to specify which Model to show in the View. The matching criteria can be represented by a "select" attribute on a <content> HTML element.

When the Controller (e.g., web application running on the EUC device 50) modifies this attribute value, the matching criteria changes, which in turn can trigger a change of what is being rendered in place of this <content> HTML element. The Model bits may not be changeable by the Controller (or View), even while the View is changed. Thus, user interfaces of web applications, and components of the user interfaces, can be manipulated, modified, and enhanced, without requiring changes to the basic code of the document markup of the web application Model.

The multimedia content (MC) packager 150 can include a computer that receives source artifacts and/or content artifacts and creates one or more multimedia content packages (MCPs). Each MCP can include data to generate DRMC messages to be rendered by the EUC devices 50. For example, the MCPs can include text, images, URL addresses, or any other data and/or instructions suitable for rendering the DRMC message by the DRMC message rendering application on the EUC devices 50. The MCP can include the multimedia content provider's image (such as, e.g., a logo or other symbol that identifies the multimedia content provider to users of the EUC devices 50), a description associated with the multimedia content provider's image, a URL address as a link to content provided and/or hosted by the multimedia content provider at the CPC device 30, among others. The multimedia content packager 150 can receive the source and/or content artifacts from the CPC interface module 170 and/or directly from the CPC device 30 via network 20.

The CPC interface module 170 can communicate with the CPC device 30 to receive one or more source artifacts and/or one or more content artifacts. For instance, the CPC interface module 170 can communicate a DRMC message capture template 200 (shown in FIG. 4) to the CPC device 30, so that source artifacts and/or content artifacts can be entered and/or uploaded by the CPC device 30. The CPC interface module 170 can further communicate with the multimedia content packager 150 to forward source and/or content artifacts for packaging in one or more MCPs. The captured source artifacts and content artifacts can be stored in the database 160.

The database 160 can store the MCPs created by the multimedia content packager 150. The MCPs can be stored as multimedia files and associated with the CPC device 30 or the multimedia content provider. Each multimedia file can include one or more source artifacts and one or more content artifacts. The multimedia files can include one or more DRMC message rendering applications.

The CPC device 30 can include a graphic user interface that can display the DRMC message capture template 200 (shown in FIG. 4), which can include one or more fields to enter and/or upload source and/or content artifacts. The DRMC message capture template 200 can include one or more fields to enter rendering commands for the source artifacts and/or content artifacts. The rendering commands can be entered into the fields by a user by means of a user interface or autonomously by the CPC device 30. The rendering commands can include, for example, one or more instructions relating to the location, layout, shape, size, color, texture, backdrop, background, and/or special effect for the source artifacts and/or content artifacts. The rendering commands can define what, where, when, and how source artifacts and/or content artifacts are to be rendered on the EUC device 50, including the location, layout, shape, size, font, color, texture, backdrop, background, and/or special effect (e.g., fade in/out, zoom in/out, camera angle, lighting, filters, etc.).

Alternatively, the rendering commands can be automatically generated by the multimedia content packager 150 using, for example, predictive analytics based on historical data, including for example, historical data related to the source artifacts, content artifacts, CPC device 30, multimedia content provider, the publishing content provider, prior DRMC messages associated with the CPC device 30 or the multimedia content provider, intended EUC devices 50, and the like.

The network interface 180 can be communicatively coupled to the network 20 via a communication link 5 to facilitate communications, including interactive communication sessions, between the multimedia communication system 10 and the network 20, as well as between the multimedia communication system 10 and external devices, such as, for example, the CPC device 30, CPS device 40, and one or more EUC devices 50, via the network 20. The network interface 180 can include a wired or a wireless communication network interface and/or a modem. When used with the Internet, the multimedia communication system 10 can be connected to the Internet through a wired and/or wireless communication network interface. The modem can be internal or external and wired or wireless. The modem can be connected to the system bus 15 via, for example, a serial port interface.

Figure 4:
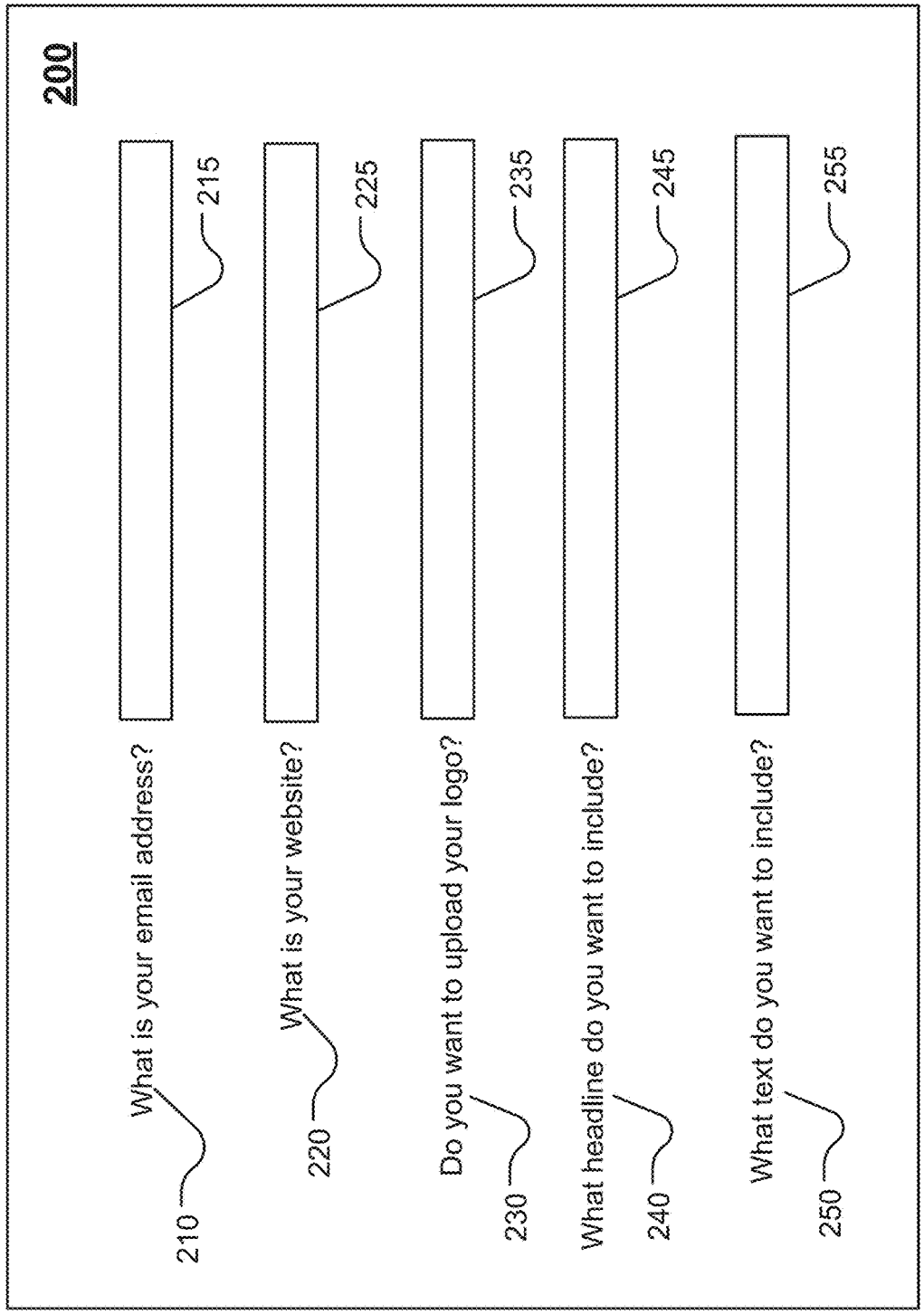
FIG. 4 depicts a multimedia content message capture template that can be provided to a content providing computing device in the environment in FIG. 2.

FIG. 4 depicts an example of the DRMC message capture template 200 that can be provided to the CPC device 30 to enter and/or upload source and/or content artifacts to the multimedia communication system 10. The DRMC message capture template 200 can be implemented to capture source and/or content artifacts for one or more multimedia content items provided by the multimedia content provider. The DRMC message capture template 200 can include one or more prompt messages 210, 220, 230, 240, 250 and one or more respective data/file entry/upload fields to be displayed on the CPC device 30 to prompt the user to enter and/or upload desired source artifacts, content artifacts, rendering commands for the source artifacts and/or content artifacts, and the like, as well as to receive and upload the entered and/or uploaded data and files. Alternatively (or additionally), the rendering commands can be solely generated by the multimedia communication system 10.

The user of the CPC device 30 can be prompted to enter and/or upload: an email address ("What is your email address?" at 210), and the data entry field 215 can receive the user's data entry; a website address ("What is your website?" at 220), which can be linked to a context selector 320 (e.g., shown in FIG. 4), and the data entry field 225 can receive the URL address entered by the user; a source artifact ("Do you want to upload your logo?" at 230), and a data entry field 235 can receive a location from which to upload a logo file; a content artifact ("What headline do you want to include?" at 240), and a data entry field 245 that can receive one or more characters of text to be included in the content artifact; and one or more additional content artifacts ("What text do you want to include?" at 250), and a data entry field 255 that can receive one or more characters of additional text to be included in the content artifact. The CPC device 30 can be prompted to enter and/or upload one or more rendering instructions for each of the source and/or content artifacts entered and/or uploaded to the DRMC message capture template 200, and one or more data entry fields can be provided to receive the respective one or more rendering instructions.

Figure 5:
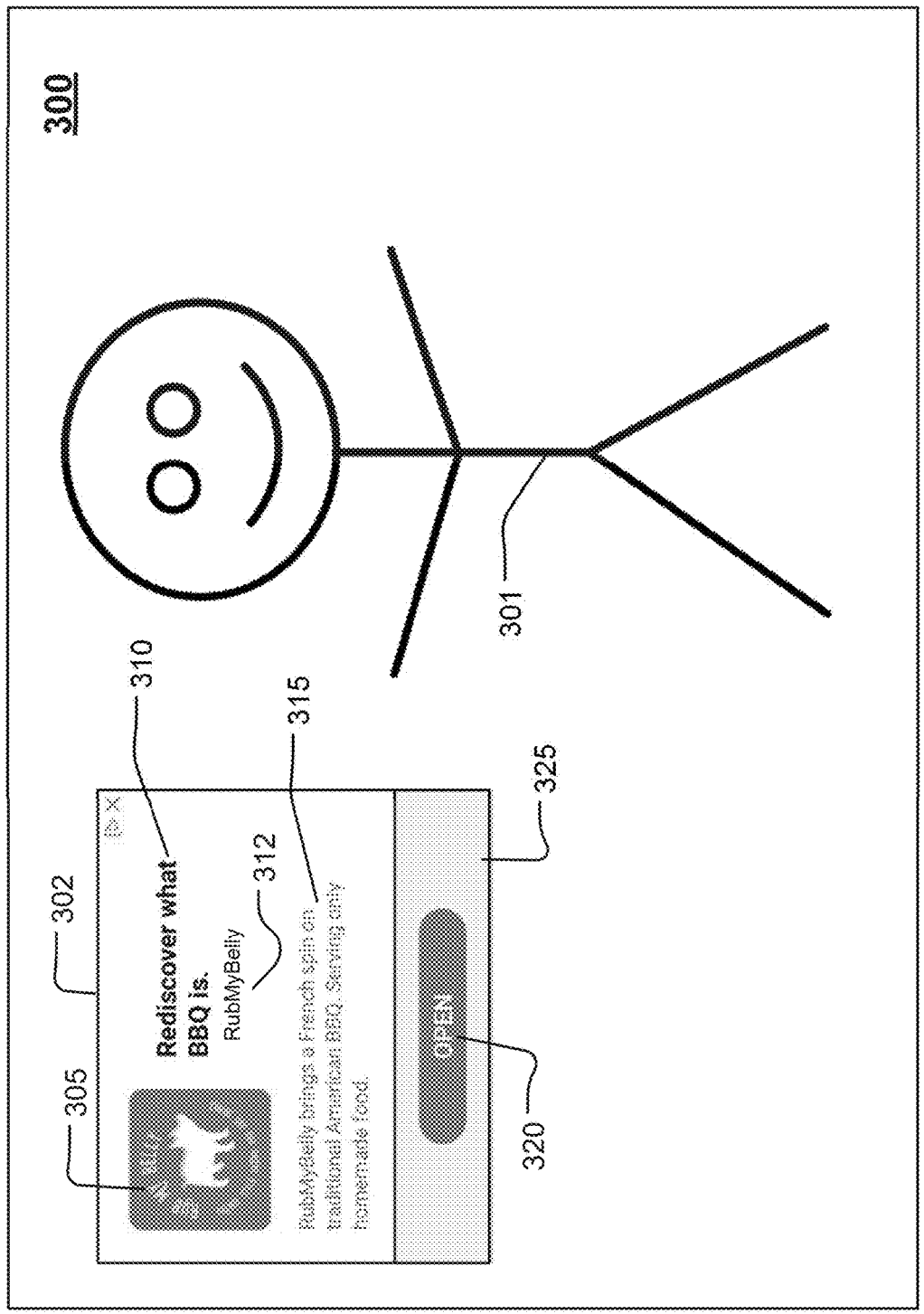
FIG. 5 depicts an example of a display screen that can be displayed on a display device on an end user computing device in the environment in FIG. 2.

FIG. 5 depicts an example of a DRMC message 302 rendered on a display screen 300 that can be generated and displayed by an EUC device 50, according to an implementation of the multimedia communication system 10. The EUC device 50 can receive an MCP from the multimedia content packager 150 or database 160 via the network 20. The received MCP can include data and instructions to render the DRMC message 302 on the EUC device 50. The MCP can include source artifacts and/or content artifacts. The MCP can include, for example, images, text, URL addresses, or any other data and/or instructions suitable for rendering the DRMC message 302 by a DRMC message rendering application. The EUC device 50 can receive a web page from the multimedia communication system 10, including primary content 301, and instructions (e.g., web page code) that invoke rendering script on the EUC device 50 to render the display screen 300.

As noted previously, the rendering script can be downloaded from the content renderer 140 to the EUC device 50 and stored locally at the EUC device 50, or it can be provided in real-time with the web page.

Executing the rendering script, the EUC device 50 can call a DRMC message rendering application and render the DRMC message 302 on the display screen 300 together with the primary content 301, as seen in FIG. 5. With the DRMC message rendering application, the EUC device 50 can render the DRMC message 302 on the display screen 300 in a manner that is appropriate for the equipment and software in the EUC device 50. In a non-limiting implementation of the multimedia communication system 10, the rendering script can cause the EUC device 50 to parse the MCP (e.g., via the DRMCA message rendering application) so that the EUC device 50 can render the DRMC message 302.

As seen in FIG. 5, the DRMC message 302 can include one or more source artifacts 305, 312, one or more content artifacts 310, 315. The DRMC message 302 can include a contextual selector 320. The DRMC message 302 can include a background 325 for the contextual selector 320. The DRMC message 302 can further include a backdrop 330 (shown in FIGS. 7A-7C).

The source artifact 305 can include a source artifact, such as, the multimedia content provider's image (e.g., a logo or other source identifier) that was uploaded to the data entry field 235 (shown in FIG. 3) by the CPC device 30. The source artifact 305 can include, for example, an oversized logo or image. The source artifact 305 can include and match the color(s) used in the multimedia content provider's image. Based on one or more annotations or instructions in the DRMC message rendering application, the EUC device 50 may render the source artifact 305 to occupy between about 12% and about 65% of a width of the content slot used to define the display area for the DRMC message 302. Other percentages are contemplated herein, including rendering the source artifact to take up less than 12%, or more than 65% of the total area of the DRMC message.

Figure 8:
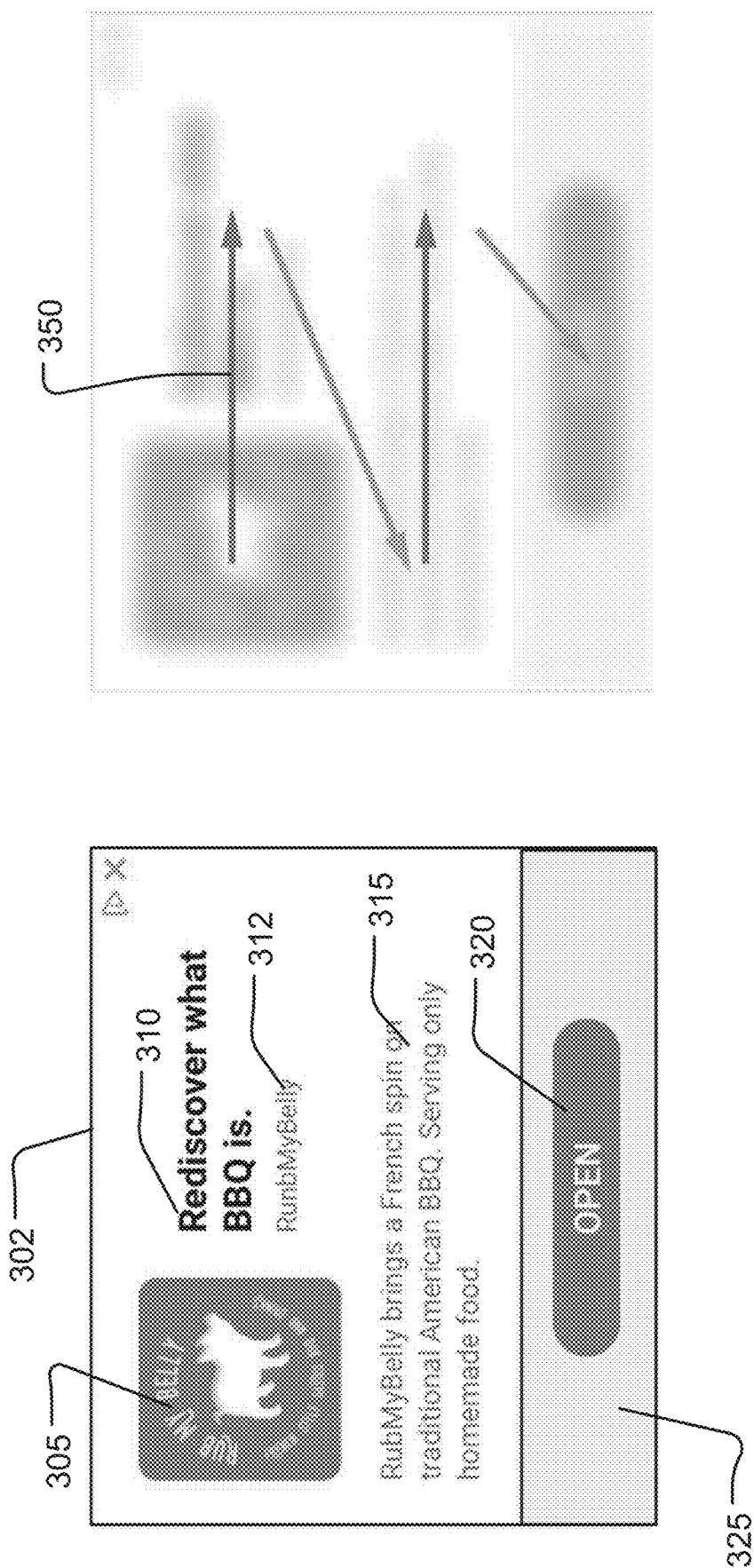
FIG. 8 depicts an example of a layout for the display responsive multimedia content message in FIG. 5.

In the examples depicted in FIGS. 5 and 8, the EUC device 50, using the DRMC message render application, may render the source artifact 305 to occupy about 36.6% of a width of the display area for the DRMC message 302. However, the DRMC message rendering application can specify that for display device screens having low pixel counts (such as, for example, less than 110 pixels across), the source artifact 305 should be scaled to about 60 pixels (e.g., 58 pixels) across, which can depend on the aspect ratio and pixel count of the display device.

The source artifact 312 can include an additional source artifact (e.g., the multimedia content provider's name) that was uploaded to data entry field 235 (shown in FIG. 3) by the CPC device 30. In the implementation illustrated in FIG. 5, the source artifact 312 includes the multimedia content provider's name "RubMyBelly". The source artifact 312 can have one or more colors, and the color(s) can be selected to match the color in the source artifact 305, the content artifacts 310, 315, the primary content 301, or to have a color that is distinct from anything on the display screen 300.

The content artifact 310 can include a content artifact such as a headline that was uploaded to the data entry field 245 (shown in FIG. 3) by the CPC device 30. In the implementation depicted in FIG. 5, the content artifact 310 include the textual headline "Rediscover what BBQ is". The content artifact 310 can have one or more colors, and the color(s) can be selected to match the color(s) in the source artifacts 305 or 312, the content artifact 315, the primary content 301, or to have a color that is distinct from anything on the display screen 300.

The content artifact 315 can include an additional content artifact such as a textual statement, a text body, or the like, that was uploaded to data entry field 255 (shown in FIG. 3) by the CPC device 30. The content artifact 315 can have one or more colors, and the color(s) can be selected to match the color in the source artifacts 305 or 312, the content artifact 310, the primary content 301, or to have a color that is distinct from anything on the display screen 300.

The contextual selector 320 can be rendered with or without the background 325. The contextual selector 320 can include clear text call to action and can be linked to, for example, a hyperlink, a URL address associated with a web page or website, such as one belonging to the CPC device 30, or other location in a document, file, or in the environment 1 (shown in FIG. 2). The contextual selector 320 can be rendered to have a capsule or oval-like shape, or any other shape that can emphasize the call-to-action aspect in the DRMC message 302. The contextual selector 320 can be rendered to have one or more colors, and the color(s) can be selected to match the color in the source artifacts 305 or 312, the content artifact 310, the primary content 301, or to have a color that is distinct from anything on the display screen 300. The contextual selector 320 can be rendered so that it is positioned to be distinct from the source artifacts and the content artifacts.

Figures 7A, 7B:
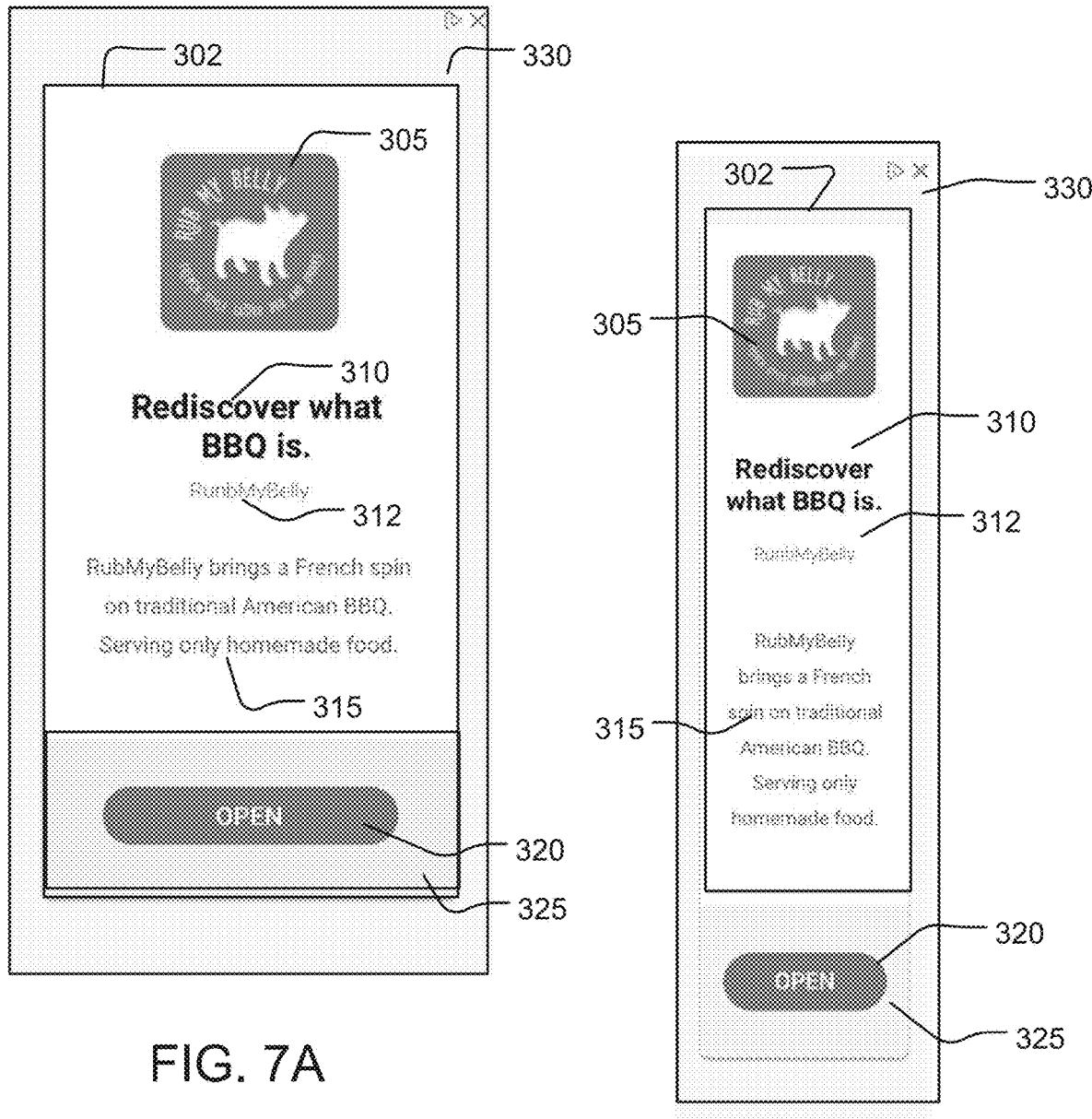
FIGS. 7A to 7D depict various examples of a display responsive multimedia content message that can be displayed on a display device of an end user computing device in the environment in FIG. 2.
Figure 7C:
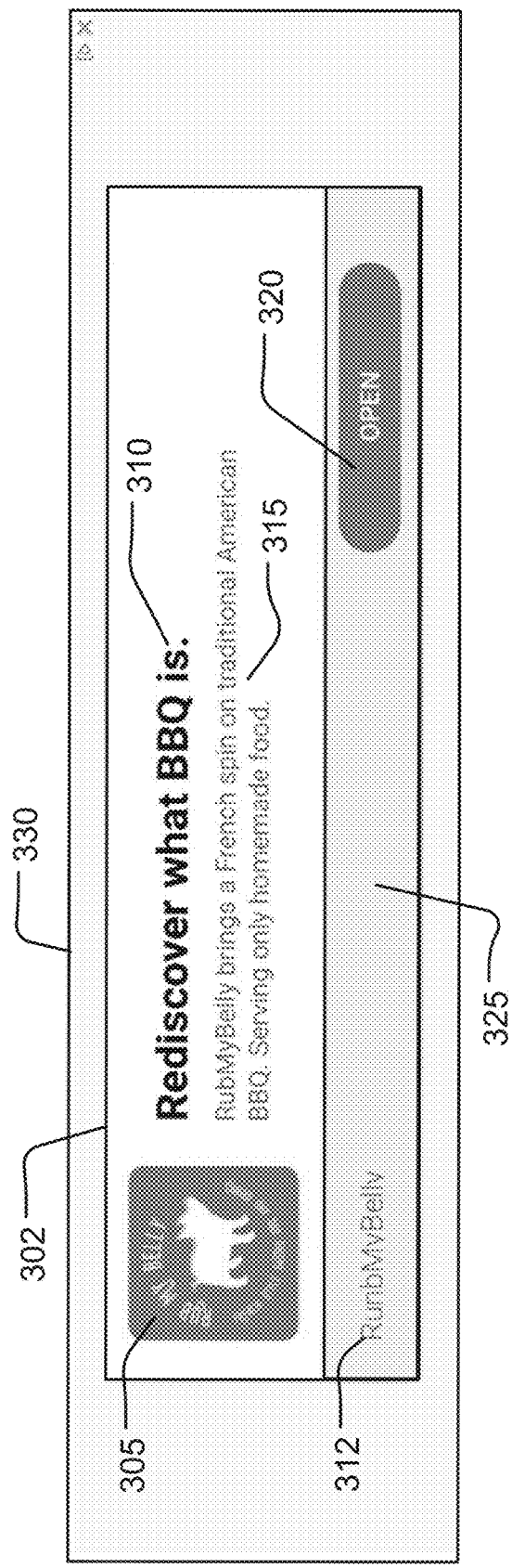
Figure 7D:
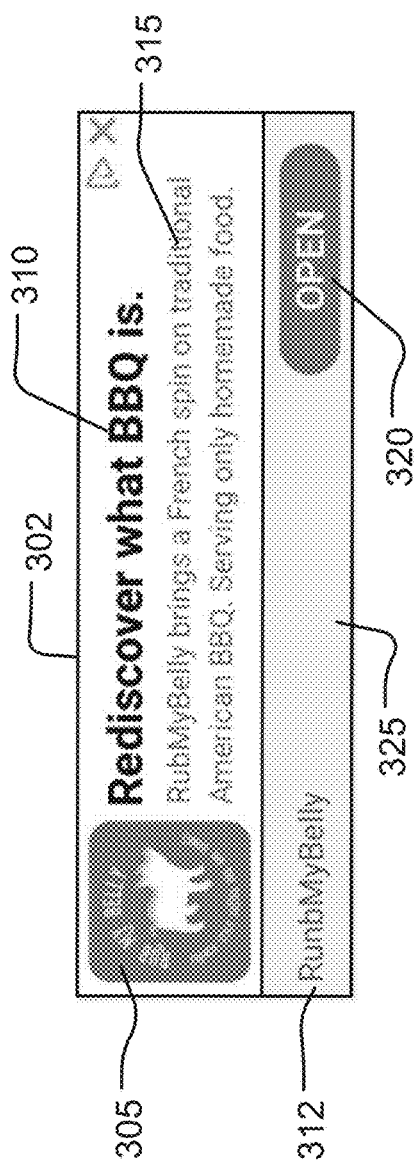

Referring to FIGS. 7A-7C, the DRMC message 302 can be rendered with a backdrop 330. The backdrop 330 can be rendered as a background for the source artifacts 305, 312, content artifacts 310, 315, and/or the contextual selector 320. The backdrop 330 can be rendered with any shape, including a rectangle, (e.g., rectangular card-like design, shown in FIGS. 7A-7C), a circle, an oval, a triangle, or any other shape that can facilitate a layout for the content slot and/or DRMC message 302. The backdrop 330 can be rendered to have one or more colors, and the color(s) can be selected to emphasize and make the source artifacts 305, 312, content artifacts 310, 315, and/or the contextual selector 320 easier to read, without causing distraction. For instance, the backdrop 330 can be rendered with a grey shade that is aesthetically appealing and that draws the user's eyes to MC item 302.

Based on one or more annotations or instructions in the DRMC message rendering application, the EUC device 50 can render the contextual selector 320 to occupy between about 50% and about 60% of a width of the display area for the DRMC message 302. Other percentages are contemplated herein, including rendering the contextual selector 320 to take up less than 50%, or more than 60% of the total width of the display area in the content slot defined for the DRMC message 302.

The contextual selector 320 can be rendered with or without the background 325. The background 325 can be rendered to occupy between about 15% and about 25% of the height of the display area for the DRMC message 302, including the backdrop 330, if applicable. Other percentages are contemplated herein, including rendering the background 325 to take up less than 15%, or more than 25% of the total height of the display area allotted to the DRMC message 302.

In the implementation depicted in FIG. 7B, the background 325 is rendered to occupy about 16.8% of the total height of the backdrop 330; whereas, in the implementation depicted in FIG. 8, the background 325 is rendered to occupy about 25% of the height of the DRMC message 302. In both implementations, the contextual selector 320 is rendered to occupy about 50% of the width of the DRMC message 302.

Referring back to the implementation depicted in FIG. 5, the EUC device 50, using the DRMC message rendering application, can render the DRMC message 302 to position it in a left-upper quadrant of the display screen 300 and scale it so that it takes up less than 25% of the total area of the display screen 300. The positioning can be based on content slot defining data and instructions received from the primary content provider. The DRMC message 302 can be rendered to display the source artifact 305 comprising, for example, the multimedia content provider's image (e.g., logo) as being oversized or large compared to the rest of the DRMC message 302. This can be advantageous in increasing recognition and awareness of the identity of the multimedia content provider associated with the DRMC message 302.

The DRMC message 302 can be rendered such that the source artifacts 305, 312, content artifacts 310, 315, and contextual selector 320 are arranged in an "F" design pattern, which is discussed in greater detail below with reference to FIG. 8. However, other implementations are contemplated herein that do not include the "F" design, but, instead, include other design patterns that facilitate optimal reading and understanding of DRMC messages 302 by users of the EUC devices 50. The DRMC message 302 can be rendered with the backdrop 330, as seen in FIGS. 7A-7C.

According to a non-limiting implementation, the DRMC message rendering application can include data and instructions that cause the EUC device 50 to render the DRMC message 302 proximate to a point of interest, such as, for example, an end point of either hand (e.g., left-hand shown in FIG. 5), either foot (e.g., shown in FIG. 6), or the head of the subject in the primary content 301 (not shown), or anywhere else on the display screen.

Figure 6:
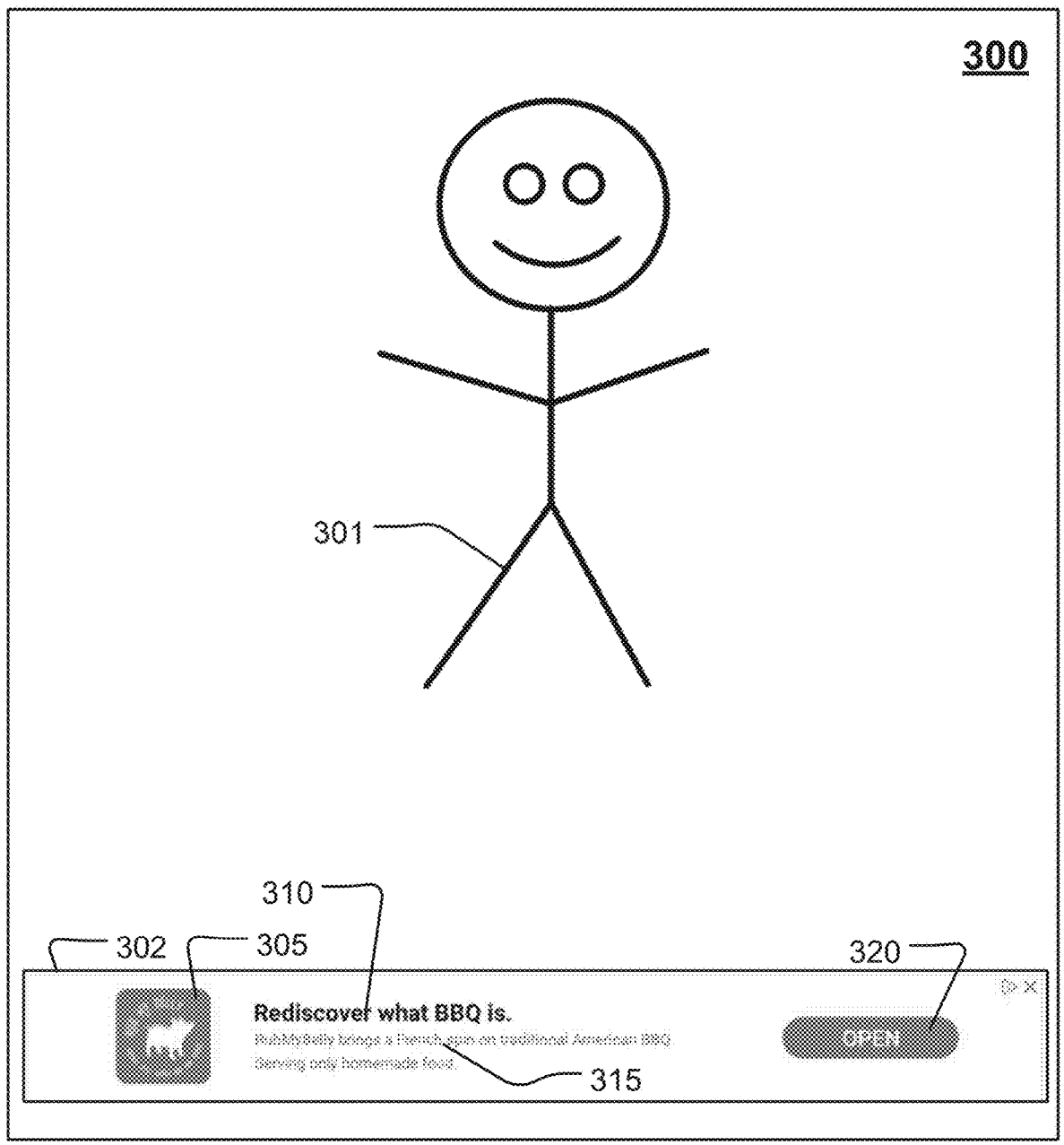
FIG. 6 depicts another example of a display screen that can be displayed on a display device of an end user computing device in the environment in FIG. 2.

FIG. 6 shows another implementation, wherein the DRMC message 302 is rendered horizontally across the bottom-most portion of the display screen 300. As seen in FIG. 6, the source artifact 305 (source artifact 312 is not shown), content artifacts 310, 315, and contextual selector 320 can be rendered responsive to the display device of the EUC device 50, including, for example, display screen size, aspect ratio, orientation (portrait or landscape), and the like. Where the EUC device 50 is configured to switch from portrait-to-landscape or landscape-to-portrait display modes, the DRMC message 302 can be automatically reshaped, resized and relocated based on the DRMC message rendering application to properly display the DRMC message 302 on the display screen, regardless of orientation of the display screen.

FIGS. 7A-7D show various implementations of the DRMC message 302 that can be rendered, using the DRMC message rendering application, on the display screen 300, with or without the primary content 301. The DRMC message rendering application can cause the color(s), imagery, shape, and texture in the source artifact 305 to be rendered by the EUC device 50 to exactly match the same color(s), imagery, shape, and texture in the multimedia content provider's image or other source identifier that was provided to be used as the source artifact 305. The color(s), shape, size and/or texture of the context selector 320 can be defined by the DRMC message rendering application to be dependent on the color(s), shape, size and/or texture of the source artifact 305, so as to render the context selector 320 similar in at least one aspect (e.g., color) to the source artifact 305. Similarly, the source artifact 312, the content artifacts 310, 315 and the backdrop 330 can be rendered on the display screen 300 by referring to and implementing the DRMC message rendering application. For instance, when the EUC device 50 device is switched from landscape display mode in FIG. 5 to portrait display mode in FIG. 6, the DRMC message 302 is automatically adjusted, based on the DRMC message rendering application, to reposition the DRMC message 302 to the bottom of the display screen and to change its shape and dimensions.

FIG. 8 depicts an implementation of an "F" design layout for the DRMC message 302 (shown in FIG. 5). As seen, the content of the DRMC message 302 can be arranged following an "F" design pattern to improve readability and quick scanning of the text. Referring to the lines 350, the content can be rendered so that the source artifact 305 is displayed in the left-upper portion of the DRMC message 302 and that the content artifact 310 (e.g., heading) is aligned and displayed along the primary focus line of preference when reading (e.g., shown by horizontal right arrows). The second content artifact 315 (e.g., textual statement or description) can be displayed along the focus re-targeting line (e.g., shown by diagonal arrows), since the reader's eyes will naturally re-target along the re-targeting line. The second content artifact 315 can be positioned along the second primary focus line, as seen in FIG. 8. The contextual selector 320 can be displayed along the second focus re-targeting line. Accordingly, when reading and/or scanning the DRMC message 302, the content will be aligned with the reader's natural preference and the reader will be guided to the contextual selector 320, which will then provide a textual indicator to the user of what will happen if the user clicks on the contextual selector 320.

Figure 9:
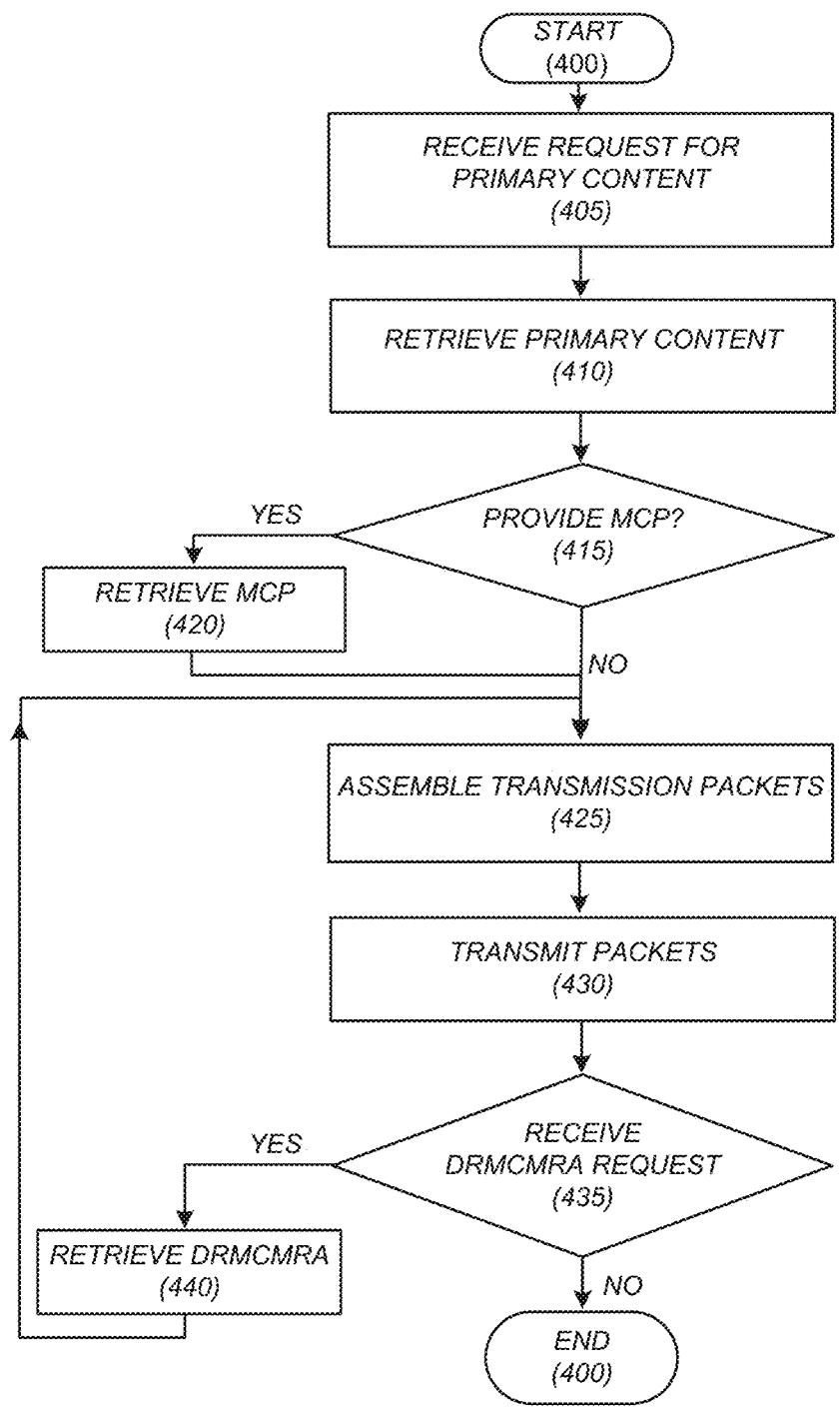
FIG. 9 depicts an example of a process for providing a multimedia content package to an end user computing device in the environment in FIG. 2 for displaying a display responsive multimedia content message with (or without) primary content on a display device of an end user computing device.

FIG. 9 depicts an example of a process 400 for providing an MCP to an EUC device 50 for displaying the DRMC message 302 with the primary content 301 on the display screen 300 of the EUC device 50. The process 400 can be carried out during a communication session between the multimedia communication system 10 and the EUC device 50, which can be carried out via the network 20 (shown in FIG. 2). During such a communication session, the primary content 301 and instructions (e.g., web page code) can be downloaded to the EUC device 50 such that the device renders and displays the DRCM message 302 on the display screen 300 together with the primary content 301 (shown in FIG. 5).

Referring to FIGS. 2, 3, 5 and 9 concurrently, a request for primary content 301 (Step 405) can be received from the EUC device 50 by the multimedia communication system 10. The request for primary content 301 (Step 405) can include a request for a web page or a website, or it can be a search query, in which case the primary content 301 can include a search results page or a landing page. The multimedia communication system 10 (e.g., under control of the CPU 110) can retrieve the primary content 301 from the database 160 or the CPS device 140 (Step 410).

A determination may be made whether a multimedia content packet (MCP) is to be provided to the EUC device 50 to render an MC item 302 on the display screen 300 (Step 415). The determination can be made by the CPU 110 referring to the database 160 and determining whether the DRMC message 302 is to be rendered on the EUC device 50, with or without the primary content 301. If it is determined that an MCP is to be provided to the EUC device 50 (YES at Step 415), then the MCP is retrieved from the database 160 or multimedia content packager 150 and assembled, with or without the primary content 301, into transmission packets (Step 425) and sent to the EUC device 50 (Step 430).

However, if it is determined that no MCP is to be provided to the EUC device 50 (NO at Step 415), then the primary content 301 is assembled into transmission packets (Step 425) and sent to the EUC device 50 (Step 430).

After the transmission packets are received by the EUC device 50, the data packets can be depacketized and parsed to provide, for example, a web page. The EUC device 50 can determine upon loading the web page whether a DRMC message rendering application (DRMCMRA) can be configured to render the DRMC message 302 on the display screen 300 based on the received MCP. If it is determined that the DRMCMRA can render the interactive DRMC message 302 on the display screen 300 (shown in FIG. 5), with or without the primary content 301, then the EUC device 50 can render and display the DRMC message 302 on the display screen 300, as discussed above with reference to FIG. 5.

If it is determined that a DRMCMRA does not exist, or that the existing DRMCMRA cannot be configured to render the DRMC message 302, then the EUC device 50 can send a DRMCMRA request to the multimedia communication system 10, which is received by the content renderer 140 (Step 435). Additionally, the content renderer 140 can determine (e.g., via the scripting module) whether the necessary DRMCMRA and/or MCP is present on the EUC device 50 (Step 435) to render the DRMC message 302 on the display screen 300 (shown in FIG. 5), such as, during the communication session between the multimedia communication system 10 and EUC device 50.

Upon receiving a request for the DRMCMRA (YES at Step 435), or the content renderer 140 determining that the DRMCMRA needs to downloaded to the EUC 50, the content renderer 140 can retrieve the DRMCMRA (Step 440), assemble it into data packets to be transmitted (Step 425) and transmit the data packets to the EUC device 50 (Step 430), including the DRMCMRA. The EUC device 50 can then render the display screen 300.

Figure 10:
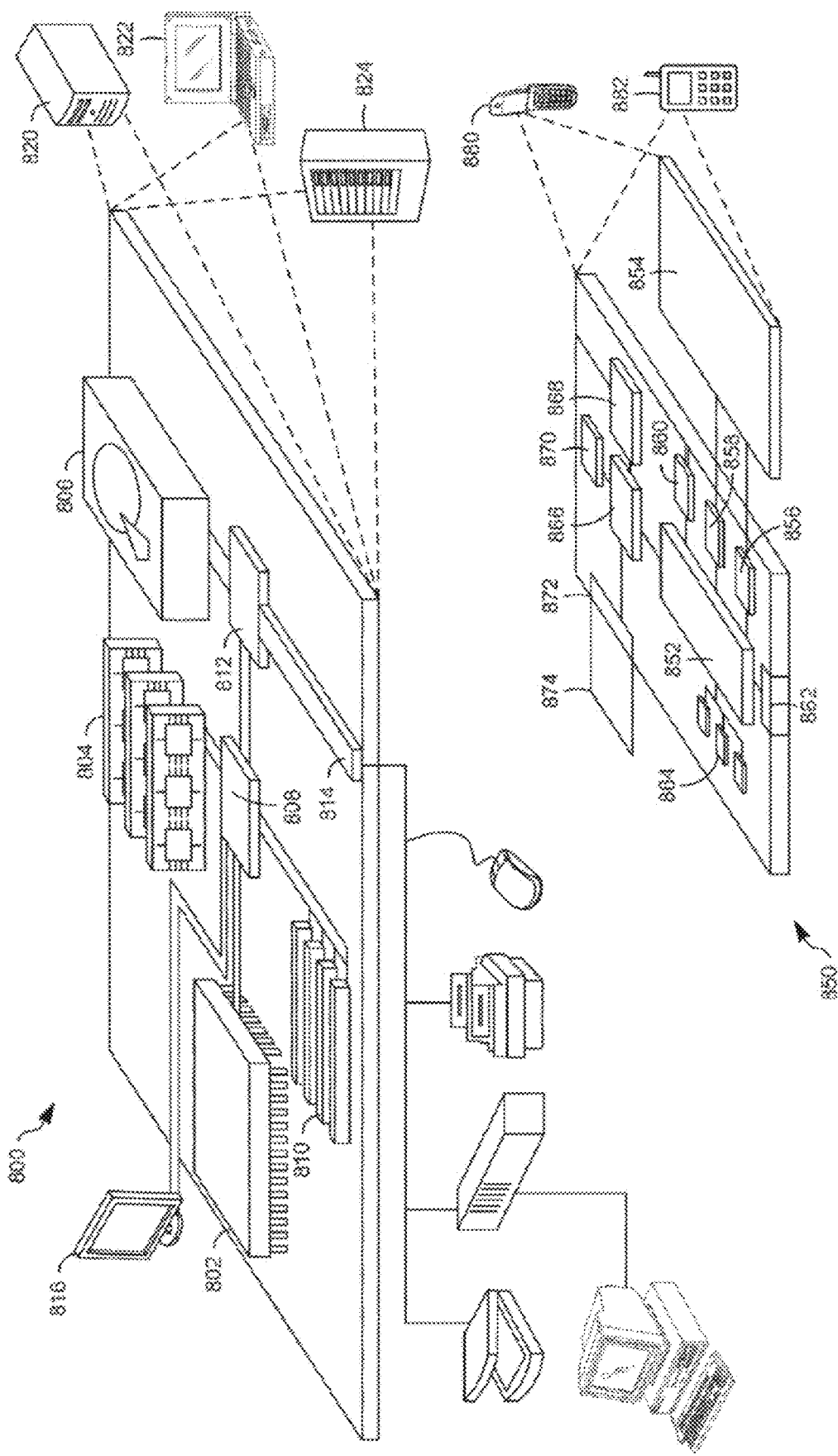
FIG. 10 depicts an example of computing devices and associated elements that can be used to implement systems and methods in accordance with the disclosure.

FIG. 10 shows a pair of examples of computing devices 800 and 850, including associated elements, that can be used to implement the systems and methods described herein. Computing device 800 is intended to represent various forms of computers and computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the disclosure.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 can be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 can also be another form of computer-readable medium, such as a magnetic or optical disk.

The storage device 806 is capable of providing mass storage for the computing device 800. In one implementation, the storage device 806 can be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB) may be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. It can also be implemented as part of a rack server system 824. In addition, it can be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 can also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor can be implemented as a chipset of chips that include separate and multiple analog and digital processors. The processor can provide, for example, for coordination of the other components of the device 850, such as control of user interfaces, applications run by device 850, and wireless communication by device 850.

Processor 852 can communicate with a user through control interface 858 and display interface 856 coupled to a display 854. The display 854 can be, for example, a TFT LCD (Thin-Film-Transistor Liquid Crystal Display) or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can be provided in communication with processor 852, so as to enable near area communication of device 850 with other devices. External interface 862 can provide, for example, for wired communication in some implementations, or for wireless communication in other implementations, and multiple interfaces can also be used.

The memory 864 stores information within the computing device 850. The memory 864 can be implemented as one or more of a computer-readable medium or media, a volatile memory unit or units, or a non-volatile memory unit or units. Expansion memory 874 can also be provided and connected to device 850 through expansion interface 872, which can include, for example, a SIMM (Single In Line Memory Module) card interface. Such expansion memory 874 can provide extra storage space for device 850, or can also store applications or other information for device 850. Specifically, expansion memory 874 can include instructions to carry out or supplement the processes described above, and can include secure information also. Thus, for example, expansion memory 874 can be provided as a security module for device 850, and can be programmed with instructions that permit secure use of device 850. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, which can be received, for example, over transceiver 868 or external interface 862.

Device 850 can communicate wirelessly through communication interface 866, which can include digital signal processing circuitry where necessary. Communication interface 866 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, such as using a BLUETOOTH, WiFi, or other such transceiver (not shown). In addition, GPS (Global Positioning System) receiver module 870 can provide additional navigation- and location-related wireless data to device 850, which can be used as appropriate by applications running on device 850.

Device 850 can also communicate audibly using audio codec 860, which can receive spoken information from a user and convert it to usable digital information. Audio codec 860 can likewise generate audible sound for a user, such as through a speaker, e.g., in a handset of device 850. Such sound can include sound from voice telephone calls, can include recorded sound (e.g., voice messages, music files, etc.) and can also include sound generated by applications operating on device 850.

The computing device 850 can be implemented in a number of different forms, as shown in the figure. For example, it can be implemented as a cellular telephone 880. It can also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

The computing system can include clients and servers. A client and server are generally remote from each other and typically interact through a communication network. The relationship of client and server arises by virtue of computer programs running on the respective computers and having a client-server relationship to each other.

The terms "a," "an," and "the," as used in this disclosure, means "one or more," unless expressly specified otherwise.

A "communication link," as used in this disclosure, means a wired, an optical, or other physical transmission medium and/or a wireless medium that conveys data or information between at least two points. The wired, optical, other physical transmission medium, or wireless medium can include, for example, a metallic conductor link, a radio frequency (RF) communication link, an Infrared (IR) communication link, an optical communication link, or the like, without limitation. The RF communication link can include a standards-based communication link such as, for example, WiFi, WiMAX, IEEE 802.11, DECT, 0G, 1G, 2G, 3G, 4G or 5G cellular standards, Bluetooth, or the like. A communication(s) link can include a public switched telephone network (PSTN) line, a voice-over-Internet-Protocol (VoIP) line, a cellular network link, an Internet protocol link, or the like. The Internet protocol can include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP, or the like), a transport layer (e.g., TCP, UDP, DCCP, SCTP, RSVP, or the like), an Internet layer (e.g., IPv4, IPv6, ICMP, ICMPv6, ECN, IGMP, IPsec, or the like), and a link layer (e.g., ARP, NDP, OSPF, Tunnels (L2TP), PPP, MAC (Ethernet, DSL, ISDN, FDDI, or the like), or the like).

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, an application-specific integrated circuit (ASIC), a programmable logic array, a field programmable gate array (FPGA), a circuit, an engine, an agent, an appliance, a central processing unit, a general purpose computer, a super computer, a quantum computer, a personal computer, a laptop computer, a palmtop computer, a notebook computer, a tablet computer, a desktop computer, a workstation computer, a server, a virtual server, or the like, or an array of processors, microprocessors, ASICs, FPGAs, central processing units, general purpose computers, super computers, quantum computers, personal computers, laptop computers, palmtop computers, notebook computers, tablet computers, desktop computers, workstation computers, servers, or the like. A computer can include, for example, a smartphone, a personal digital assistant, a mobile device, a consumer computing device, a digital video recorder, a set-top box for a television, a video game console, or any other computing device that can be configured to communicate data and instructions without departing from the scope or spirit of the instant disclosure.

A "computer-readable medium," as used in this disclosure, means any non-transitory computer readable storage medium that participates in providing data and/or instructions that can be read by a computer, including non-volatile media or volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a read only memory (ROM), a CD-ROM, DVD, any other optical medium, punch cards, paper tape, any other physical medium with patterns of holes, a random access memory (RAM), a programmable ROM (PROM), an electrically programmable ROM (EPROM), an electrically-erasable PROM (EEPROM), a FLASH-EEPROM, any other memory chip or a cartridge from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction can be delivered from a RAM to a processor and/or formatted according to numerous formats, standards or protocols, including, for example, WiFi, WiMAX, IEEE 802.11, DECT, 0G, 1G, 2G, 3G or 4G cellular standards, Bluetooth, or the like.

A "content artifact," as used in this disclosure, means an advertisement, a service offering, a product offering, a service listing, a product listing, text, a photo or an image, a uniform resource locator (URL) address, a sound, and/or the like.

A "data processing apparatus," "data processing system," "user device," or "computing device" encompasses all kinds of apparatus, devices, and machines for processing data, including by way of example a computer. The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application can include, but is not limited to, for example, an application program that can accept connections to service requests from one or more computers and send back responses to the one or more computers. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

An "information resource," as used in this disclosure means, but is not limited to, computer code or computer executable instructions that cause content to be displayed on a display device, and/or to invoke a function to display the content such as on a website or web page that includes primary content or a search results landing page provided by a search engine.

An "instruction," as used in this disclosure means, but is not limited to, a computer program or a computer executable code or section of computer executable code that, when executed by a computer, causes or results in an action, a process, or a step being or to be performed or carried out.

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, a satellite network, the Internet, or other types of data networks, or any combination of the foregoing, any of which can be configured to communicate data via a wireless, optical, or other physical transmission medium and/or a wired communication medium. A network can be implemented using any known network protocol, including, but not limited to, for example, TCP/IP, IRC, HTTP, Ethernet, FIREWIRE, GSM, EDGE, TDMA, CDMA, Bluetooth, WiFi, VoIP, WiMax, and the like.

A "platform," as used in this disclosure, means any computer hardware, software, or combination of hardware and software, including, for example, computer hardware and operating system software.

A "server," as used in this disclosure, means any combination of software and/or hardware, including at least one application and/or at least one computer to perform services for connected clients as part of a client-server, server-server, or client-client architecture. The at least one server application can include, but is not limited to, for example, an application program that can accept connections to service requests from clients/servers by sending back responses to the clients/servers. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

A "source artifact," as used in this disclosure, means any mark, symbol, or sound, or any combination thereof that identifies a person, an entity (e.g., a company, a manufacturer, a service provider, a distributor, a supplier, etc.), an article, a product, a service, or the like, including, but not limited to, for example, a logo, a brand, an emblem, a sign, a trademark, a trade dress, an image, a stamp, a badge, or the like.

Devices that are in communication with each other need not be in continuous communication with each other, unless expressly specified otherwise. In addition, devices that are in communication with each other can communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A multimedia communication system having a server including at least one processor for transmitting a display responsive multimedia content message to an end user computing device to be rendered on a display device, the server comprising:
    a content packager that assembles a multimedia content package comprising the multimedia content message;
    a content renderer that generates a display responsive multimedia content rendering application associated with the multimedia content message; and
    a network interface arranged to connect to a network via a communication link, the network interface being coupled to the content packager and content renderer to transmit the multimedia content package or the display responsive multimedia content rendering application over the communication link to the end user computing device,
    wherein the multimedia content message includes a source artifact having an image, a content artifact having text, and a contextual selector having a hyperlink, and
    wherein the display responsive multimedia content rendering application includes one or more annotations or instructions to:
        render the multimedia content message at a location on the display device and having a layout and size customized to the end user computing device;
        display the source artifact to occupy a first portion of a display area for the multimedia content message on the display device;
        display the text to occupy a second portion of the display area for the multimedia content message on the display device; and
        display the contextual selector to occupy a third portion of the display area for the multimedia content message on the display device, with the contextual selector being scaled in size based on size of an image in the source artifact.

2. The multimedia communication system of claim 1, wherein the display responsive multimedia content rendering application includes one or more annotations or instructions to render the multimedia content message to display the source artifact, content artifact and contextual selector in an F-pattern layout.

3. The multimedia communication system of claim 1, wherein the display responsive multimedia content rendering application includes one or more annotations or instructions to render the source artifact to occupy between about 12% and about 65% of a width of the display area for the multimedia content message.

4. The multimedia communication system of claim 1, wherein the display responsive multimedia content rendering application includes one or more annotations or instructions to render the source artifact to occupy about 36% of a width of the display area for the multimedia content message.

5. The multimedia communication system of claim 1, wherein the display responsive multimedia content rendering application includes one or more annotations or instructions to render the contextual selector to occupy between about 50% and about 60% of a width of the display area for the multimedia content message.

6. The multimedia communication system of claim 1, wherein the multimedia content message further includes a call-to-action backdrop, and wherein the display responsive multimedia content rendering application includes one or more annotations or instructions to render the contextual selector with the call-to-action backdrop to occupy between about 15% and about 25% of a height of the display area for the multimedia content message.

7. The multimedia communication system of claim 1, wherein the multimedia content message further includes a call-to-action backdrop, and wherein the display responsive multimedia content rendering application includes one or more annotations or instructions to render the contextual selector with the call-to-action backdrop to occupy about 17% of a height of the display area for the multimedia content message.

8. The multimedia communication system of claim 1, wherein the display responsive multimedia content rendering application includes one or more annotations or instructions to render the source artifact to occupy a pixel array size based on an image resolution of the display device and one or more content slot defining instructions that define the display area for the multimedia content message.

9. The multimedia communication system of claim 8, wherein the one or more content defining instructions comprise a height value and a width value.

10. The multimedia communication system of claim 8, wherein the one or more content defining instructions comprise a display screen location value.

11. A non-transitory computer-readable medium containing computer executable instructions that, when executed by a hardware processor of a first device, cause the processor to perform operations, comprising:
    retrieving a multimedia content package from a content packager or a database at the first device;
    retrieving a display responsive multimedia content rendering application at the first device, the display responsive multimedia content application being associated with the multimedia content package;
    assembling the multimedia content package and the display responsive multimedia content rendering application into a plurality of transmission packets; and transmitting the plurality of transmission packets to a second device, wherein the multimedia content package comprises a multimedia content message, wherein the multimedia content message includes a source artifact having an image, a content artifact having text, and a contextual selector having a hyperlink, and wherein the display responsive multimedia content rendering application includes one or more annotations or instructions to:

render the multimedia content message at a location on a display of the second device and having a layout and size customized to the second device;

display the source artifact to occupy a first portion of a display area for the multimedia content message on the display of the second device;

display the text to occupy a second portion of the display area for the multimedia content message on the display of the second device; and display the contextual selector to occupy a third portion of the display area for the multimedia content message on the display of the second device, with the contextual selector being scaled in size based on size of an image in the source artifact.

12. The non-transitory computer-readable medium in claim 11, wherein the display responsive multimedia content rendering application includes one or more annotations or instructions to render the multimedia content message to display the source artifact, content artifact and contextual selector in an F-pattern layout.

13. The non-transitory computer-readable medium in claim 11, wherein the display responsive multimedia content rendering application includes one or more annotations or instructions to render the source artifact to occupy between about 12% and about 65% of a width of the display area for the multimedia content message.

14. The non-transitory computer-readable medium in claim 11, wherein the display responsive multimedia content rendering application includes one or more annotations or instructions to render the source artifact to occupy about 36% of a width of the display area for the multimedia content message.

15. The non-transitory computer-readable medium in claim 11, wherein the display responsive multimedia content rendering application includes one or more annotations or instructions to render the contextual selector to occupy between about 50% and about 60% of a width of the display area for the multimedia content message.

16. The non-transitory computer-readable medium in claim 11, wherein the multimedia content message further includes a call-to-action backdrop, and wherein the display responsive multimedia content rendering application includes one or more annotations or instructions to render the contextual selector with the call-to-action backdrop to occupy between about 15% and about 25% of a height of the display area for the multimedia content message.

17. The non-transitory computer-readable medium in claim 11, wherein the multimedia content message further includes a call-to-action backdrop, and wherein the display responsive multimedia content rendering application includes one or more annotations or instructions to render the contextual selector with the call-to-action backdrop to occupy about 17% of a height of the display area for the multimedia content message.

18. The non-transitory computer-readable medium in claim 11, wherein the display responsive multimedia content rendering application includes one or more annotations or instructions to render the source artifact to occupy a pixel array size based on an image resolution of the display device and one or more content slot defining instructions.

19. The non-transitory computer-readable medium in claim 18, wherein the one or more content defining instructions comprise a height value and a width value.

20. The non-transitory computer-readable medium in claim 18, wherein the one or more content defining instructions comprise a display screen location value.

\* \* \* \* \*